United States Patent
Figa et al.

(10) Patent No.: US 8,619,965 B1
(45) Date of Patent: Dec. 31, 2013

(54) ON-HOLD PROCESSING FOR TELEPHONIC SYSTEMS

(75) Inventors: Romek Figa, Hanover, MA (US); Michael A. Figa, Hanover, MA (US)

(73) Assignee: Abraham & Son, Hanover, MA (US)

( * ) Notice: Subject to any disclaimer, the term of this patent is extended or adjusted under 35 U.S.C. 154(b) by 279 days.

(21) Appl. No.: 13/096,172

(22) Filed: Apr. 28, 2011

Related U.S. Application Data

(60) Provisional application No. 61/332,437, filed on May 7, 2010.

(51) Int. Cl.
*H04M 3/42* (2006.01)

(52) U.S. Cl.
USPC ............... 379/215.01; 379/88.01; 379/93.35; 704/208; 704/228

(58) Field of Classification Search
USPC ........ 704/228, 208; 379/215.01, 88.01, 93.35
See application file for complete search history.

(56) References Cited

U.S. PATENT DOCUMENTS

| | | | |
|---|---|---|---|
| 3,961,142 A | 6/1976 | Caffine | 179/81 |
| 4,425,479 A | 1/1984 | Dubner et al. | 179/81 |
| 4,731,822 A | 3/1988 | Berry, III et al. | 379/204 |
| 4,748,670 A | 5/1988 | Bahl et al. | 381/43 |
| 4,834,551 A | 5/1989 | Katz | 379/68 |
| 4,924,496 A | 5/1990 | Figa et al. | 379/142 |
| 5,155,761 A | 10/1992 | Hammond | 379/67 |
| 5,185,782 A | 2/1993 | Srinivasan | 379/67 |
| 5,293,584 A | 3/1994 | Brown et al. | 395/2.86 |
| 5,436,967 A | 7/1995 | Hanson | 379/266 |
| 5,477,451 A | 12/1995 | Brown et al. | 364/419.08 |
| 5,764,746 A | 6/1998 | Reichelt | 379/207 |
| 5,768,603 A | 6/1998 | Brown et al. | 395/759 |
| 5,805,832 A | 9/1998 | Brown et al. | 395/752 |
| 5,822,403 A | 10/1998 | Rowan | 379/68 |
| 5,875,231 A | 2/1999 | Farfan et al. | 379/67 |
| 6,031,905 A | 2/2000 | Furman et al. | 379/201 |
| 6,118,861 A | 9/2000 | Gutzmann et al. | 379/201 |
| 6,122,346 A | 9/2000 | Grossman | 379/68 |
| 6,141,328 A | 10/2000 | Nabkel et al. | 370/259 |
| 6,219,415 B1 | 4/2001 | Deutsch et al. | 379/215 |
| 6,301,346 B1 | 10/2001 | Lee | 379/162 |
| 6,400,804 B1 | 6/2002 | Bilder | 379/76 |
| 6,597,779 B1 | 7/2003 | Wilk et al. | 379/210.01 |

(Continued)

FOREIGN PATENT DOCUMENTS

| | | | | |
|---|---|---|---|---|
| WO | WO 2010/028327 | | 3/2010 | H04W 4/16 |

OTHER PUBLICATIONS

Jelinek, *Statistical Method for Speech Recognition* (The MIT Press, Cambridge, Massachusetts, 1997).

(Continued)

*Primary Examiner* — Gerald Gauthier
*Assistant Examiner* — Simon King
(74) *Attorney, Agent, or Firm* — Sunstein Kann Murphy & Timbers LLP

(57) ABSTRACT

Certain embodiments of the present invention employ targeted speech detection as part of end-of-hold detection in an end-of-hold notification system. The targeted speech detector is configured to be particularly sensitive to specific words or phrases so as to increase the likelihood of detecting a correct end-of-hold condition while reducing the likelihood of false end-of-hold detection. Targeted speech detection may be used along with other detection mechanisms such as DTMF detection and/or background noise detection.

50 Claims, 9 Drawing Sheets

(56) References Cited

U.S. PATENT DOCUMENTS

| | | | |
|---|---|---|---|
| 6,704,565 B1 | 3/2004 | Parsons et al. | 455/414.1 |
| 6,768,722 B1 | 7/2004 | Katseff et al. | 370/260 |
| 6,885,741 B1 | 4/2005 | Puckett et al. | 379/210.01 |
| 7,031,923 B1 | 4/2006 | Chaudhari et al. | 704/273 |
| 2006/0126803 A1* | 6/2006 | Patel et al. | 379/88.01 |
| 2007/0003045 A1* | 1/2007 | Florkey et al. | 379/215.01 |
| 2009/0207996 A1 | 8/2009 | Berger | 379/266.01 |

OTHER PUBLICATIONS

Bansal, *Speech Recognition System*, found at cseweb.ucsd.edu/classes/fa06/cse237a/finalproj/ruchi.pdf, undated (possibly Fall 2006).

\* cited by examiner

ON-HOLD PROCESSING FOR TELEPHONIC SYSTEMS

CROSS-REFERENCE TO RELATED APPLICATION(S)

This patent application claims the benefit of U.S. Provisional Patent Application No. 61/332,437 entitled ON-HOLD PROCESSING FOR TELEPHONIC SYSTEMS filed on May 7, 2010, which is hereby incorporated herein by reference in its entirety.

FIELD OF THE INVENTION

The present invention relates generally to on-hold processing for telephonic systems.

BACKGROUND OF THE INVENTION

End-of-hold notification (EOHN) schemes have been proposed to allow one party to a phone call (referred to herein as "Party A") to suspend the phone call and receive a signal when the other party (referred to herein as "Party B") is available to continue the phone call. For example, Party A might want to activate EOHN if Party B puts Party A on hold, switches over to another phone call, steps away from the phone, or otherwise disengages from the conversation. Among other things, EOHN allows Party A to avoid continually aurally monitoring the line and to be notified when the call can be resumed.

Generally speaking, EOHN works as follows. Party A activates EOHN, e.g., by pressing a designated key or entering a designated code on his or her phone. A message is played to Party B to inform Party B that EOHN has been activated and perhaps telling Party B to press a key (or a specific key) to reconnect with Party B. When a determination is made that Party B is ready to reconnect (e.g., upon detecting a key pressed by Party B), a signal is sent to Party A's phone to inform Party A. A signal also may be sent to Party B's phone to let Party B know that Party A is being contacted.

In various EOHN schemes, the message played to Party B's phone may be played by Party A's phone, by the phone system, or by other devices in communication with Party B's phone. Similarly, detecting when Party B becomes available may be performed in a variety of ways (e.g., detecting that the call has been removed from hold, detecting a key pressed by Party B, etc.) and by any of various devices. Also, the signal sent to Party A's phone may be any of a variety of signals, including an actual call back to Party A's phone, a digital signal that causes Party A's phone to ring and/or vibrate, etc. Depending on how these various features are implemented in a given EOHN system, Party A might or might not hang up after activating EOHN; the phone call between Party A and Party B might or might not be disconnected; and devices that perform EOHN functions might or might not require specific hardware.

In addition to the core EOHN functionality as discussed above, additional signals may be sent to Party B's phone to control an indicator (e.g., a light), which may be turned on when Party A activates EOHN and turned off if and when Party A deactivates EOHN (which may be done before Party B even knows that EOHN had been activated). For example, special DTMF tones may be played at the beginning of each iteration of the message, with special detection circuitry used to detect the signals and control the indicator.

The following U.S. patents may be relevant to EOHN systems: U.S. Pat. Nos. 3,961,142; 4,731,822; 5,155,761; 5,185,782; 5,436,967; 6,141,328; 6,885,741; 6,031,905; 4,425,479; 4,834,551; 5,764,746; 5,822,403; 5,875,231; 6,885,741; 6,597,779; 6,400,804; 6,768,722; 6,219,415; 6,118,861; 6,301,346; 6,704,565; and 6,597,779.

The following relate to on-hold systems that employ speech recognition to detect "off-hold" condition:

U.S. Pat. No. 6,122,346 (Grossman) mentions speech recognition.

US Publication No. 2007/0003045 says that a hold determination system may use automatic speech recognition logic to determine that a party has taken the first call off hold and begun speaking. The speech recognition logic is able to distinguish active voice from a recording or music typically used by call centers. Active voice is defined herein as speech from a person being a party to a call, as distinguished from recordings or music.

US Publication No. 2009/0207996 (Berger) relates to something referred to as an Independent Communication System (ICS) that is used to wait on hold and provide a notification upon detecting voice cues indicating that the live operator is available.

PCT Publication No. WO 2010/028327 (Kole) relates to an on hold call back telephone feature.

Each of the references mentioned above is hereby incorporated herein by reference in its entirety.

SUMMARY OF EXEMPLARY EMBODIMENTS

In accordance with one aspect of the invention there is provided an end-of-hold notification method that involves, upon activation of end-of-hold notification from a first communication device, activating a targeted speech detector to monitor a communication connection with a second communication device, the targeted speech detector configured specifically to be sensitive to a predetermined end-of-hold word or phrase audibly received from the second communication device over the communication connection. The method further involves, after detection of the predetermined word or phrase by the targeted speech detector, such detection indicating an end-of-hold condition, providing an indication to a user of the first communication device to indicate that communication with the second communication device can be resumed. The method further involves resuming communication between the first communication device and the second communication device.

In accordance with another aspect of the invention there is provided apparatus for end-of-hold notification including a communication interface, a targeted speech detector configured specifically to be sensitive to a predetermined end-of-hold word or phrase audibly received over the communication interface, and an end-of-hold notification controller configured to activate the targeted speech detector to monitor a communication connection with a second communication device upon activation of end-of-hold notification from a first communication device and to determine whether an end-of-hold condition exists based at least in part on an output of the targeted speech detector. The end-of-hold notification controller is further configured to provide an indication to a user of the first communication device upon detection of the end-of-hold condition.

In various alternative embodiments, the word or phrase may be provided by the party who activates the end-of-hold notification mechanism, e.g., as a text or audio input that is converted to reference data for the targeted speech detector. Such an audio input may represent a message to be played following activation of the end-of-hold notification mechanism, in which case converting the audio input to reference data for the targeted speech detector may involve processing the audio input to identify a portion of the message containing the word or phrase and converting such portion of the message to reference data for the targeted speech detector. The targeted speech detector may be further configured to detect at least one DTMF signal that indicates the end-of-hold condition. The targeted speech detector may be further configured to detect a change in sound level, wherein the end-of-hold determination is based at least in part on the detected change in sound level In further alternative embodiments, the first communication device may be disconnected from the communication connection after activating the end-of-hold notification mechanism. A signal may be provided to the second communication device upon activation of the end-of-hold notification mechanism to indicate such activation. Such a signal may specify the predetermined word or phrase. The signal provided to the second communication device may include an audio message (which may include a standard message and/or a personalized message). Additionally or alternatively, the signal provided to the second communication device may include a textual or graphical message for display on a phone or computer display. In various embodiments, the signal sent to the second communication device may include an audio message played over the communication connection, a DTMF signal sent over the communication connection, and/or a signal sent outside of the communication connection.

In certain embodiments, the targeted speech detector may be in the first communication device. In other embodiments, the targeted speech detector may be in a device other than the first communication device, and, upon detection of the end-of-hold condition, a signal may be sent to the first communication device, wherein the indication may be prompted by such signal. A microphone in the first communication device may be disabled upon activation of the end-of-hold notification mechanism. The first communication connection may be terminated upon activation of the end-of-hold notification mechanism.

In certain embodiments, a signal may be provided to the second communication device to indicate that an unrecognized response was detected upon detecting speech other than the predetermined word or phrase. A signal may be provided to the second communication device to indicate that communication with the first communication device is being resumed upon detecting the end-of-hold condition. A speakerphone mode of the first communication device may be activated after resuming communication between the first communication device and the second communication device. When the end-of-hold notification mechanism is activated, a timer may be started, and upon expiration of the timer, the end-of-hold notification mechanism may be deactivated. Upon activation of the end-of-hold notification mechanism, an input device on the first communication device may be disabled to prevent accidental deactivation of the end-of-hold notification mechanism or accidental termination of the communication connection. The end-of-hold notification mechanism may be deactivated prior to detection of the end-of-hold condition (e.g., by one of the parties pressing a predetermined button), in which case, a signal may be provided to the second communication device indicating such deactivation.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
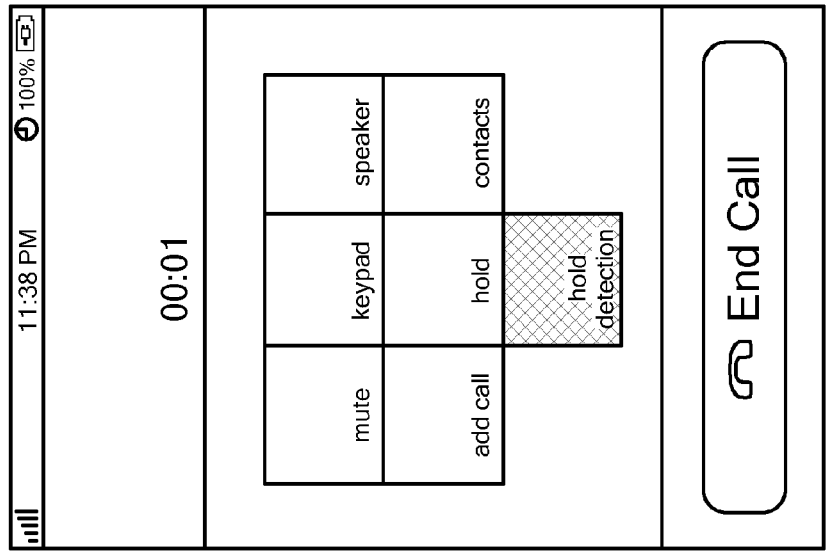
FIG. 1 shows a sample screen in which EOHN ("hold detection") is listed as one of a number of selectable "soft key" options after the original phone call has been established.

Notwithstanding the substantial amount of prior art in the area of EOHN systems, as evidenced in the background section above, the inventors of the subject patent application suspect that the apparent dearth of EOHN systems of the type discussed above may stem mainly from the realities of detecting when Party B has become available. For example, attendants in company call centers who place callers on-hold might be unwilling or unable to take actions that are out of the ordinary course (e.g., pressing one or more keys to reconnect with Party A), and the use of generic voice detection may be impractical for certain implementations (e.g., it might be expensive to add the necessary digital signal processing) or may be too error-prone for general use (e.g., the systems could easily be fooled by commonly-used on-hold message systems, leading to false detection and hence premature calls back to Party A). Embodiments of the present invention are directed to various EOHN enhancements/improvements.

Targeted Speech Detector for EOH Detection

As discussed above, as part of an EOHN scheme, Party A activates EOHN in order to receive a signal when Party B is prepared to resume the call. Various techniques may be used to detect that Party B is available (which may be referred to herein as "end of hold detection" or "EOH detection" regardless of whether Party B actually put the call on hold).

As discussed above, generic speech detection has been proposed for EOH detection, but such generic speech detection may result in false positive EOH detection, such as incorrectly detecting an EOH due to on-hold music or messages (e.g. "we apologize for the wait, an operator will be with you shortly"). It is desirable to maximize the likelihood that a true EOH condition is automatically and intelligently recognized while false positive EOH detection events are minimized or virtually eliminated.

In certain embodiments of the present invention, targeted speech detection may be used for EOH detection (either alone or along with other options, such as DTMF detection). Here, the speech detector is configured to be particularly sensitive to a limited number of specific words or phrases. Among other things, such targeted speech detection will tend to increase the likelihood of detection while reducing the chances of false positive and false negatives. Such a targeted speech detector may use speech recognition, speech-to-text, acoustic fingerprinting, or other processing techniques.

Speech recognition concepts are described generally in the oft-cited book by Frederick Jelinek entitled *Statistical Method for Speech Recognition* (The MIT Press, Cambridge, Mass., 1997) and in U.S. Pat. Nos. 4,748,670, 5,293,584, 5,477,451, 5,768,603, and 5805832 invented or co-invented by Frederick Jelinek. Each of these references is hereby incorporated herein by reference in its entirety. Generally speaking, speech recognition involves extracting characteristic features of a spoken word or phrase to derive a test pattern and comparing combinations of reference patterns from a database to the test pattern to determine whether the test pattern sufficiently matches a valid combination of references patterns or to identify a combination of reference patterns that most closely matches the test pattern. The matching may be based on statistical pattern recognition using acoustic recognition models such as templates or hidden Markov models or may be based on other matching techniques such as dynamic time warping. Typically, the matching results in a set of scores that are used to determine a closeness of match, e.g., using a Viterbi algorithm.

Generally speaking, the targeted speech detection contemplated for embodiments of the present invention may be considered a form of speaker-independent small vocabulary speech recognition, although typical large vocabulary speech recognition techniques also may be employed. Because Party B (i.e., the party who will speak the EOH word or phrase) is typically unknown a priori, the targeted speech detector typically will not be configured or dynamically adapted to a particular speaker or group of speakers, although the reference data may be adapted over time to "learn" from both positive and negative responses received from multiple speakers to further improve the likelihood of positive matches and reduce the likelihood of false positives. U.S. Pat. No. 7,031,923 (Chaudhari et al.), which is hereby incorporated herein by reference in its entirety, describes specific techniques that may be used for password generation/verification that avoids the computational complexity of a large vocabulary decoder. Exemplary embodiments of the present invention may employ such speech recognition techniques for both detecting an EOH condition based on a limited vocabulary of target words/phrases and dynamically programming the targeted speech detector for a user-provided (or machine-generated) target word or phrase. The targeted words or phrases may be selected from among a standard list of words or phrases supported by the EOHN system. Without limitation, a partial list of standard single words might include such things as "hello," "hi," "excuse," "miss," "misses," and "mister," while standard phrases might include such things as "are you there," "excuse me," and "can I help you." One or more standard words or phrases may be "hard coded" into the system such that the targeted speech detector essentially is only capable of detecting those words or phrases, or Party A may be permitted to select one or more words or phrases from among the standard list, allowing for some customization by Party A as discussed more fully below.

Additionally or alternatively, the word or phrase to be detected may be provided by Party A and then programmed into the speech detector. For example, the EOHN system may include a mode by which Party A can specify the word or phrase to be detected (e.g., by entering text of the word or phrase, or by speaking the word or phrase), and the system converts the information provided by Party A into reference data (sometimes referred to as "fingerprints") for matching by the speech detector. The system may prompt the user to specify the word or phrase or, alternatively, the system may recognize the word or phrase in the custom outgoing message provided by Party A (discussed below).

Typically, the signal provided to Party B during EOHN would specify the word(s) or phrase(s) that can be spoken by Party B to signal EOH. For example, an audio message might say something like 'end-of-hold notification has been activated, please say "hello" to be reconnected,' although the word or phrase additionally or alternatively may be conveyed to Party B in other ways, e.g., via a textual or graphical message that may be displayed on a phone or computer display.

The message played to Party B may be a standard message (e.g., programmed into the software), although alternative embodiments may permit Party A to specify a custom message (e.g., by recording an audio message or by entering the text of the message). The custom message may be the entire message provided to Party B or just part of the message provided to Party B (e.g., the personalized message may be followed by a standard message specifying the options for Party B). Practically speaking, the message provided to Party B, whether a standard message, a custom message, or a combination of both, must make it clear that Party B should say the targeted word or phrase in order to be reconnected with Party A. Personalization of the message is expected to increase the likelihood that Party B will comply.

Thus, for example, Party A may instruct the system to listen for a specific personalized word or phrase (e.g., "hello Bob") and create a custom message containing that word or phrase (e.g., 'When you want to reconnect with me, please say "hello Bob" and I will be contacted'). In this way, the EOHN interface is more natural and therefore is more likely to result in compliance by Party B. Furthermore, the ability for Party A to customize the targeted word or phrase makes it less likely that the targeted word or phrase would be included in an on-hold message provided by Party B (e.g., recorded music, a radio station, or a recorded message about Party B's products or services).

Such targeted speech detection may be used alone or along with other options such as DTMF detection. For example, the signal provided to Party B during EOHN might indicate that Party B can either speak the specific word or phrase or enter a specific code from the keypad (e.g., an audio message might say something like 'on-hold callback has been activated, please say "hello" or press any key to be reconnected.' The detector would be configured appropriately, e.g., to either monitor for speech or speech and standard telephone DTMF signals, such as DTMF tones associated with the numeric, pound, and asterisk keys.

Other cues, such as a change in background noise level that often accompanies a transition from on-hold to off-hold, may be used as informational inputs to help correctly determine an EOH.

Thus, an EOH detector in an EOHN system of the type described herein uses information from a targeted speech detector and optionally information from a DTMF detector, a background noise detector, and/or other information to detect an EOH condition from Party B.

With targeted speech detection, the specified word or phrase might be one that the returning party is likely to say regardless of prompting (e.g., "hello" or "thanks for holding"), which may result in quicker detection in some cases, since detection may occur even before the signal prompting the specific word or phrase has been provided (or provided in its entirety) to Party B. Alternatively, the specified word or phrase might be one that the returning party is unlikely to say without prompting (e.g., "I'm back").

In any case, among other things, configuring a targeted speech detector for the specific word or phrase should improve sensitivity to that word or phrase while reducing false positives and false negatives (i.e., failing to indicate detection when the correct word or phrase is spoken), and it also should make it easier and less expensive to implement, e.g., by limiting the amount of signal processing required to effectuate detection. When used in combination with DTMF detection, detecting the specified DTMF signal (which may be a single key or a combination of keys) would immediately indicate EOH.

In certain embodiments, if the targeted speech detector detects speech but does not detect the specific word or phrase, the signal provided to Party B may be continued/repeated, and/or a new signal may be provided to Party B (e.g., "your response was not recognized" followed by the original message prompting the specific word or phrase).

In essence, such targeted speech detectors can be used in an EOHN system in addition to, or in place of, DTMF and generic voice detectors implemented in any of various devices in the EOHN system.

Upon EOH detection, Party A will be notified that the call is ready to be resumed. Party A can be notified in any of a variety of ways. For example, the phone may be made to ring and/or vibrate, and/or a message may be displayed on the screen of the phone. In certain implementations, Party A may be permitted to customize the type of notification, e.g., using a distinctive ring for a call back in order to distinguish it from a new incoming call. Party A may be permitted to press a designated hard or soft key in order to resume the call with Party B (e.g., a "soft key" displayed on a touch screen display).

Also upon EOH detection, a signal may be presented to Party B so that Party B will know that Party A is being reconnected (e.g., a new audio message such as "caller being notified, caller being notified" repeatedly in a ringing style, or an updated display on a phone or computer screen). The signal may be a standard signal (e.g., a standard message programmed into the software), or Party A may be permitted to select/create the type of signal that is presented to Party B while the call is being reconnected, e.g., a pre-recorded message, a user recordable message, or a text-to-voice option. A personalized message might reduce the likelihood that Party B will disconnect while the call is being reconnected.

EOHN User Interface

Various embodiments may allow EOHN to be activated by Party A in any of a variety of ways. For example, Party A may activate EOHN in one or more of the following ways:

- a dedicated button provided on Party A's phone (e.g., either an existing phone button reprogrammed for the purpose or a new button added to future phones);
- a button on Party A's phone programmed for activating EOHN (either permanently programmed or programmed in-context);
- selected from a menu displayed on the phone;
- activated by entering a specific code (e.g., from the phone keypad);
- activated using a programmed "soft key" (e.g., an option displayed on a touch-sensitive screen); and/or
- activated using voice activation/recognition.

EOHN may be activated by Party A any time during the call, whether or not Party B actually put Party A on hold.

Specifically with regard to programmable phones (e.g., certain mobile phones, PBX extension phones, etc.), when the phone call is active, the display on the phone could include a message/option allowing Party A to activate EOHN, e.g., a "soft" key that they user can press on a touch screen or designating a specific button (e.g., the green "call" button) on the cell phone. Selection could send a special code (e.g., using DTMF signals) or other signal. So, for example, when a phone call is active, a digital cell phone display might include options for disconnecting by pressing the "red" disconnect button or activating EOHN by pressing the green or other button. Screen displays might change after activation of EOHN, e.g., deactivate EOHN to return to normal holding, reset EOHN timer, disconnect call, etc.

The following are some exemplary user interface screens for a smartphone or other programmable phone implementation (e.g., computer-based telephony), merely to demonstrate how some EOHN functionality might be integrated into such devices.

FIG. 1 shows a sample screen in which EOHN ("hold detection") is listed as one of a number of selectable "soft key" options after the original phone call has been established.

Figure 2:
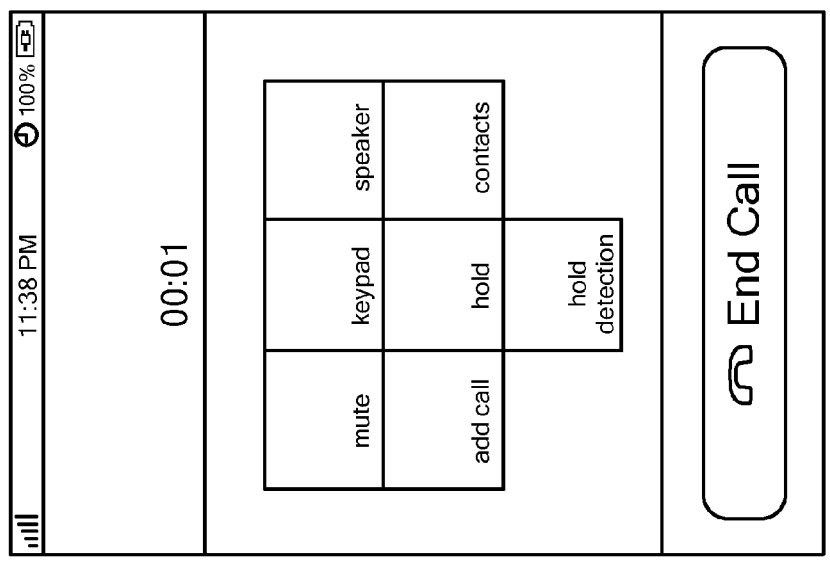
FIG. 2 shows a sample screen after EOHN has been activated, as represented by highlighting of the "hold detection" soft key.

FIG. 2 shows a sample screen after EOHN has been activated, as represented by highlighting of the "hold detection" soft key.

When EOHN is enabled, the phone will begin actively sampling and monitoring the incoming audio from Party B in order to perform EOH detection according to a predetermined EOH detection scheme (e.g., using targeted speech detection and/or DTMF detection), and the phone will repeatedly send a message on the outgoing audio to Party B (e.g., 'on-hold callback has been activated, please say "hello" or press any key to be reconnected'). The phone's microphone generally would be disabled during EOH detection and playing of the message, although the phone's speaker might still operate so that Party A could monitor the call if desired (such operation might be user-selectable).

As discussed above, the message played to Party B during EOHN may be a standard message and/or may include a user-recorded message. The user may be provided an opportunity to record a message, e.g., upon pressing the "hold detection" button to enable EOHN (not shown in the figures). For example, upon pressing the "hold detection" button, the user may be asked "do you want to record a message," to which the user can either select "no" to proceed with a standard message or select "yes" to record a message. A user-recorded message might be the sole message played to Party B or may be played to Party B followed by a standard message.

When EOH is detected, a signal is provided to notify Party A that Party B is available (e.g., ring and/or vibrate, blinking light, verbal announcement, and/or a message displayed on the screen), and a signal may be sent to Party B (e.g., an audio message) to inform Party B that EOH has been detected. This signal might be sent once or might be repeated periodically until Party A takes action to reconnect with Party B.

Figure 3:
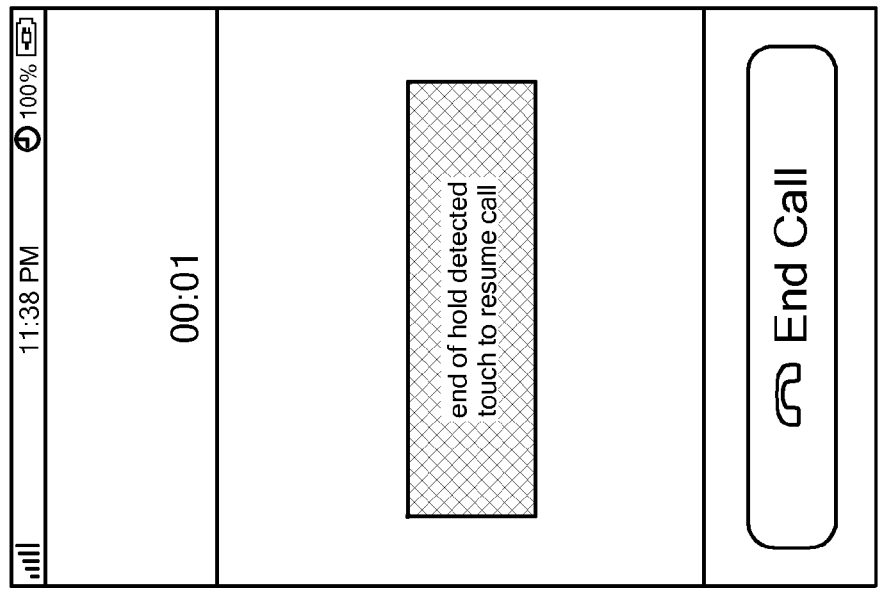
FIG. 3 shows a sample screen after EOH has been detected. Here, a message is displayed to inform Party A that EOH has been detected and also providing a "soft key" that Party A can use to resume the call.

FIG. 3 shows a sample screen after EOH has been detected. Here, a message is displayed to inform Party A that EOH has been detected and also providing a "soft key" that Party A can use to resume the call.

In order to minimize the lag time between EOH detection and a live verbal connection between Party A and Party B, different operations could be taken upon EOH detection. In one alternative, upon EOH detection, the phone provides a signal (e.g., a short ring and/or vibrate) and then immediately enters standard speaker phone mode, instantly allowing Party A to converse with the Party B. The action to take upon EOH detection could be user-selectable, e.g., from a menu.

As discussed above, while in the EOH detection mode, the outgoing message generally would be the only outgoing audio stream, and the microphone would essentially be muted. However, the other phone operations would still function generally as they would during a standard phone call. The user could still listen to the phone earpiece to monitor or check the incoming audio if desired. The user could also activate speaker phone, if desired.

Figure 4:
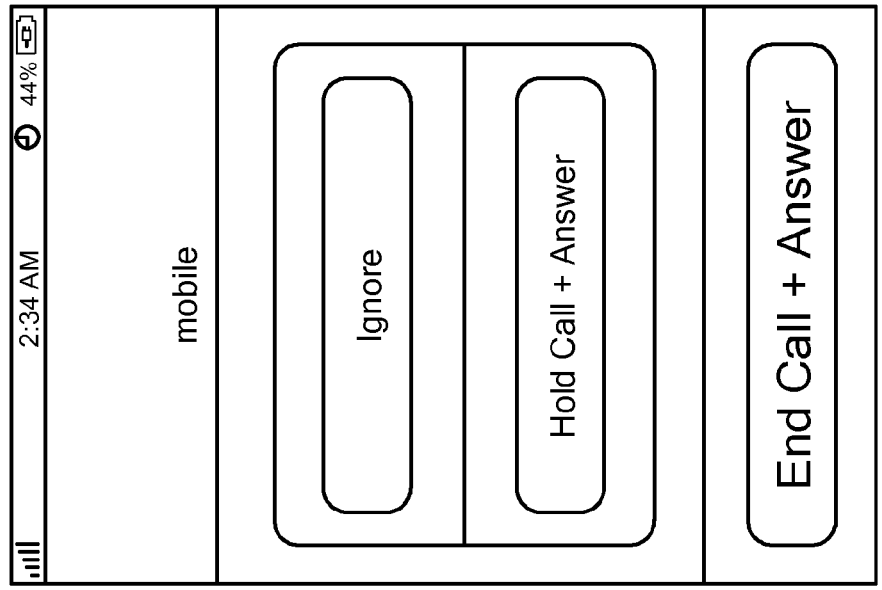
FIG. 4 shows a sample screen providing options when a new incoming call is received while EOHN is active.

One particular situation is if a new call is received during EOH detection mode (which typically would be audibly signaled by the phone using a so-called "beep" signal). In this case, the phone is aware of the incoming call, and the software would similarly detect that there is another incoming call. Standard options generally would be displayed as if the user was in a standard phone call, for example, as shown in FIG. 4 (e.g., here, Party A can choose to ignore the new incoming call or to hold the current call and answer the new incoming call). However, because the user might not be listening to the incoming audio feed to detect the "beep," the phone generally would notify the user of the incoming call through some other mechanism. In general, the phone will ring and/or vibrate, utilizing the same method the phone has set for receiving phone calls.

After EOHN is activated, the phone may generate a periodic reminder (e.g., by a visual, audible, and/or tactile indication) to remind the user that EOHN is active.

Certain implementations may allow the user to disable EOHN prior to detecting EOH to return to regular holding (e.g., by pressing the "hold detection" soft key). In this case, the EOH detection would be disabled, the phone would stop playing the outgoing message, and the phone's microphone would be re-enabled.

Figure 5:
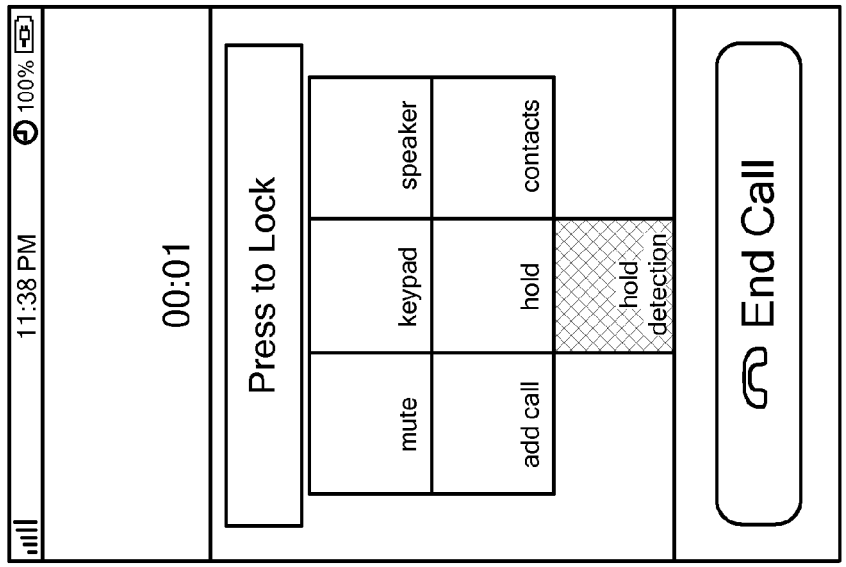
FIG. 5 shows a sample screen including a timer display and soft key for adding additional time to an EOHN timer.

Certain implementations may allow the call placed on EOHN to terminate automatically if EOH is not detected within a predetermined amount of time. In this case, when EOHN is activated, a timer is started, and if the timer expires before EOH is detected, the call is terminated (e.g., the phone disconnects the call, turns off EOH detection, stops sending the outgoing message, and generally returns to normal phone operation). The amount of time might be set as a default (e.g., 30 minutes) and could be customizable by the user, e.g., a default selected from a menu, or a time selected at the time EOHN is activated (e.g., Party A may be prompted for an EOHN time after pressing the "hold detection" soft key). Furthermore, the phone generally would allow Party A to manually "reset" the timer or otherwise extend the EOHN time. Thus, the time left before call termination may be displayed, and the user generally would be given the option to extend the amount of time by simply pressing a button, for example, as shown in FIG. 5. The user may be signaled prior to termination of the call to provide an opportunity for the user to extend the EOHN time.

Figure 6:
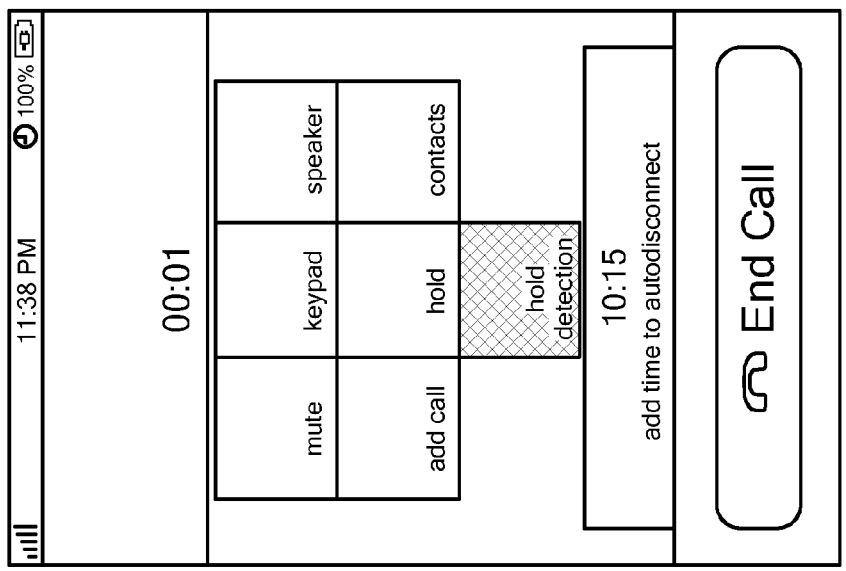
FIG. 6 shows a sample screen including a soft key to lock the phone.
Figure 7:
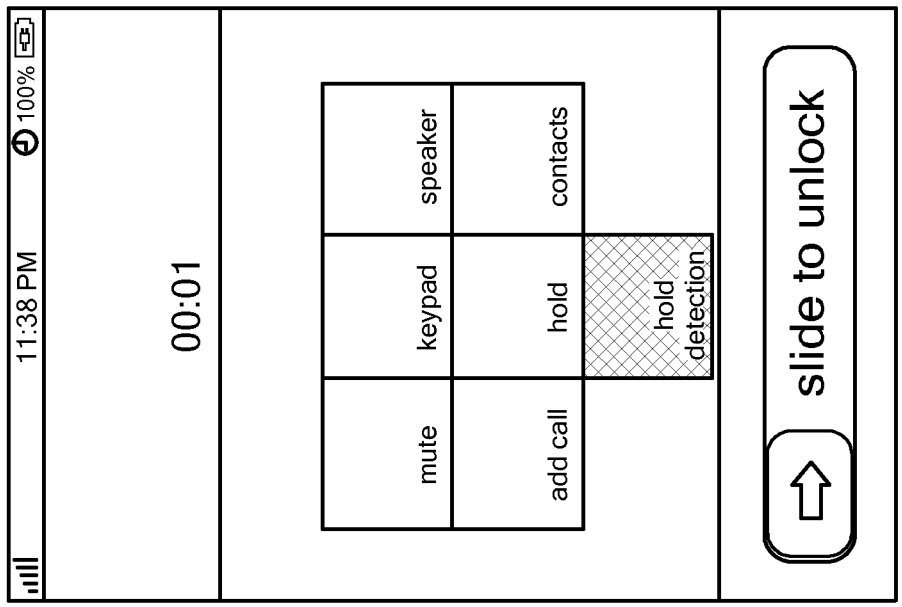
FIG. 7 shows a sample screen including a soft slide control for unlocking the phone.

Another concern for phone operation when in the EOH detection mode is the possibility that the user may unintentionally touch a key. Cell phone users would often store the phone in their pocket while on hold, therefore this is an important issue. To solve this problem, the phone could have a control feature to "lock" the phone. For touchscreen phones, a "soft key" may be used to lock the phone, for example, as shown in FIG. 6, and the phone may be unlocked using a "soft" slide control, for example, as shown in FIG. 7. Additionally or alternatively, if a key is pressed, the phone may have a control feature to prompt the user and require an additional input before deactivating EOHN or taking other action. If locked, the phone generally would require the user to unlock the phone to perform any operation. This would apply even if the EOH is detected, or there is another incoming call. Among other things, this prevents the user from ending the call or taking any other action accidentally when retrieving the phone, regardless of the phone mode.

Certain embodiments provide additional signaling through which an indicator on Party B's phone can be controlled by Party A's phone, specifically for signaling when EOHN is enabled and disabled. For example, when Party A activates EOHN, a signal may be sent to Party B's phone (e.g., using special DTMF tones transmitted at the beginning of each iteration of the outgoing audio messages or using other signaling). Upon detection of such signals by Party B's phone, Party B's phone provides an indication to Party B, e.g., turn on a light, display a message, output a sound and/or vibrate, etc. If Party A disables EOHN, then Party A's phone might send a different signal or might simply stop sending the foregoing signal, and Party B's phone would turn off the indication upon detecting the different signal or upon failing to detect the foregoing signal for a predetermined amount of time. Such additional signaling and indication should increase the likelihood that Party B will take the appropriate action to reconnect with Party A.

It should be noted that the main screen shown in FIG. 1 includes a "hold" option in addition to the "hold detection" option for selection after the phone call has been established. The "hold" button would be used by Party A to effectively put the call on hold, as opposed to the "hold detection" button, which activates end-of-hold notification. Thus, generally speaking, either party to a call may put the other party on hold, and either party may activate EOHN.

The "hold" function can work in a variety of ways, but generally speaking, placing the call on hold would at least mute the microphone. The phone may be configured to play a message during hold (e.g., a standard message or a user-recorded message). The phone speaker may be disabled or may be left enabled. Various functions may be user-selectable, e.g., from a menu.

Figure 8:
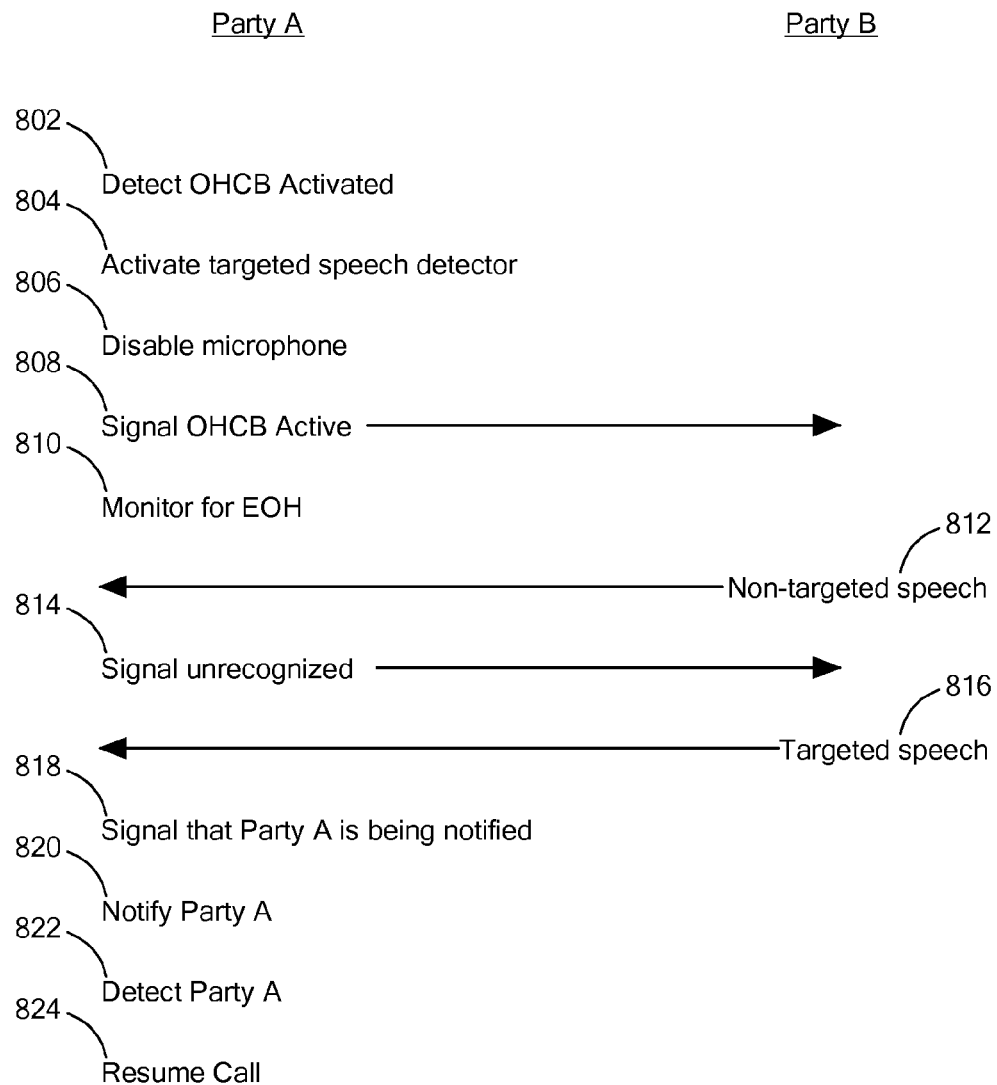
FIG. 8 is a logic and message flow diagram for end-of-hold notification managed by Party A's phone, in accordance with an exemplary embodiment of the present invention.

FIG. 8 is a logic and message flow diagram for end-of-hold notification managed by Party A's phone, in accordance with an exemplary embodiment of the present invention. In step 802, Party A's phone detects that Party A has activated EOHN. In step 804, the phone activates a targeted speech detector, which may also include DTMF detection and/or detection of other cues such as changes in background audio. In step 806, the phone disables the microphone. In step 808, the phone sends a signal to Party B's phone indicating that EOHN is active. This signal may include audio (e.g., specifying targeted speech) and/or other information, such as a message to display on Party B's phone. Party A's phone then monitors for EOH in step 810. Upon receiving speech other than the targeted speech in step 812, the phone may send a signal in step 814 indicating that the response was not recognized and/or may continue sending a signal of the type sent in step 808. Upon receiving targeted speech or other EOH condition in step 816, the phone may send a signal to Party B's phone that Party A is being notified in step 818. The phone notifies Party A in step 820 (e.g., by vibrating, ringing, or generating some other audible and/or non-audible signal). Upon detecting that Party A is back in step 822 (e.g., upon Party A pressing a designated key), the call is resumed in step 824.

It should be noted that the phone-based implementations described above may be extended to other types of devices (e.g., computers, company on-hold systems, etc.) such that EOHN can be implemented with little or no modification to the phone system and in many cases with only a software change to the device itself. For example, if Party B's device is a company on-hold system that implements the call back scheme as described above, the phone number may be dialed automatically when Party B takes the call off hold with no further human intervention. Thus, for example, a particular vendor of such devices may implement EOHN as a value-added feature independently of other vendors.

It should be noted that the targeted speech detection described above may be used in EOHN systems wherever EOH detection is implemented, which may be in an end device such as a phone, in the phone system, in an intermediate device between the phone and the phone system, or elsewhere. Similarly, other features described above may be implemented in different devices.

Figure 9:
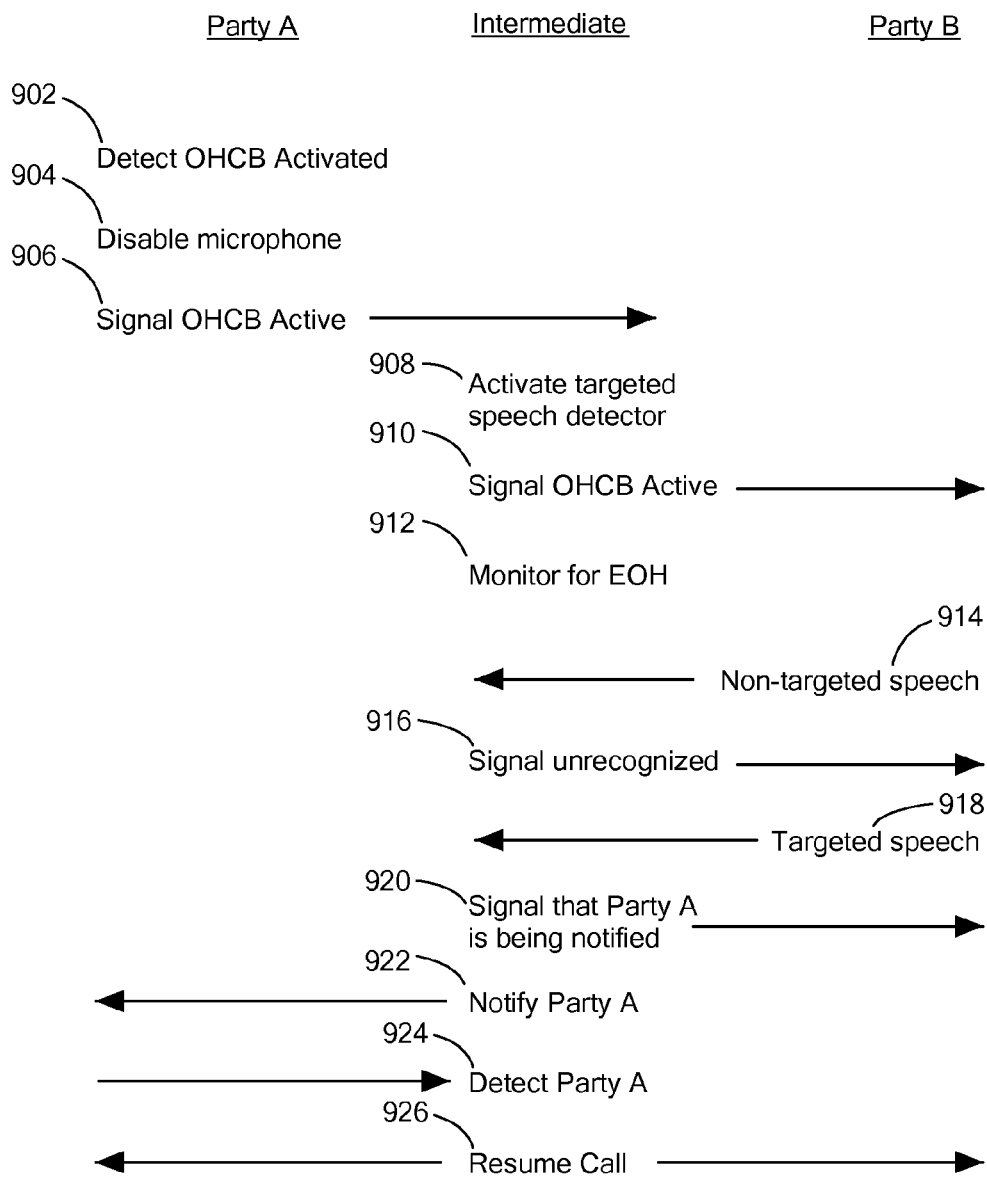
FIG. 9 is a logic and message flow diagram for end-of-hold notification managed by an intermediate device (e.g., a device in the telephone provider system), in accordance with an exemplary embodiment of the present invention.

FIG. 9 is a logic and message flow diagram for end-of-hold notification managed by an intermediate device (e.g., a device in the telephone provider system), in accordance with an exemplary embodiment of the present invention. In step 902, Party A's phone detects that Party A has activated EOHN, disables the microphone in step 904, and sends a signal to the intermediate device indicating that EOHN is active in step 906. In step 908, the intermediate device activates a targeted speech detector, which may also include DTMF detection and/or detection of other cues such as changes in background audio. In step 910, the intermediate device sends a signal to Party B's phone indicating that EOHN is active. This signal may include audio (e.g., specifying targeted speech) and/or other information, such as a message to display on Party B's phone. The intermediate device then monitors for EOH in step 912. Upon receiving speech other than the targeted speech in step 914, the intermediate device may send a signal in step 916 indicating that the response was not recognized and/or may continue sending a signal of the type sent in step 910. Upon receiving targeted speech or other EOH condition in step 918, the intermediate device may send a signal to Party B's phone that Party A is being notified in step 920. The intermediate device notifies Party A (e.g., by vibrating, ringing, or generating some other audible and/or non-audible signal) in step 922. Upon detecting that Party A is back in step 924 (e.g., upon Party A pressing a designated key, with an appropriate signal sent to the intermediate device), the call is resumed in step 926.

In certain embodiments of the present invention, EOHN functionality may be implemented predominantly or exclusively by Party B's phone (e.g., a digital smartphone) using in-band signaling carried over the phone call. For example, rather than having Party A's phone turn on EOH detection and play a message to Party B when EOHN is activated, Party A's phone may send a signal to Party B's phone (e.g., using DTMF signals) to tell Party B's phone that Party A is no longer holding and essentially asking for a call back. The signal sent to Party B's phone may include the phone number for Party B to call back (e.g., Party A may be given an option to send the phone number associated with the cell phone or to send a different number). Party B's phone might send a confirmation signal to Party A's phone upon receipt of the EOHN activation signal (e.g., using special DTMF tones). After activating EOHN and performing such signaling, Party A's phone typically hangs up, either manually or automatically. There is no need for Party A's phone, the service provider, or other device to play a recorded message to Party B's phone. Instead, Party B's phone provides an indication/reminder that Party A is waiting for a call back (e.g., visual, audible, and/or tactile indication) and allows Party B to easily call back Party A, e.g., by allowing Party B to simply press a designated button (e.g., a "soft key" on a touch screen or the green "call" button) to initiate the call back to Party A. In this way, the original call does not remain active during EOHN, and the call back to Party A is an actual telephone call, which may be handled by Party A's phone like a new incoming call (e.g., the phone rings and displays caller-ID information).

Figure 10:
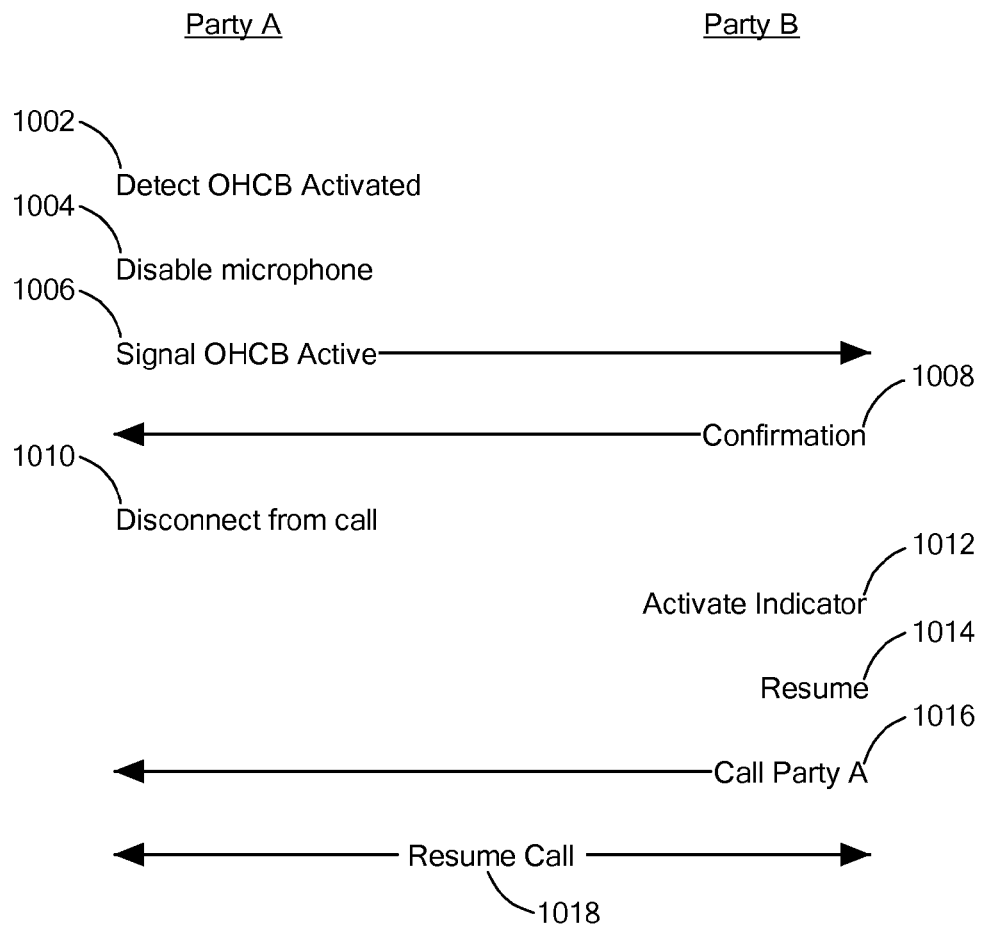
FIG. 10 is a logic and message flow diagram for end-of-hold notification managed by Party B's phone, in accordance with an exemplary embodiment of the present invention.

FIG. 10 is a logic and message flow diagram for end-of-hold notification managed by Party B's phone, in accordance with an exemplary embodiment of the present invention. In step 1002, Party A's phone detects that Party A has activated EOHN, disables the microphone in step 1004, and sends a signal to Party B's phone indicating that EOHN is active in step 1006. The signal sent in step 1006 may include a phone number at which Party A wants to be called back. Either Party A or Party B typically disconnects the call, in step 1010. Party B's phone may activate an indicator (e.g., turn on a light or display a message) in step 1012. When Party B resumes the call in step 1014, Party B places a call to Party A in step 1016, e.g., at a phone number provided by Party A in step 1006. The call is therefore resumed in step 1018.

Devices that implement some or all of the described EOHN functionality generally include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

Figure 11:
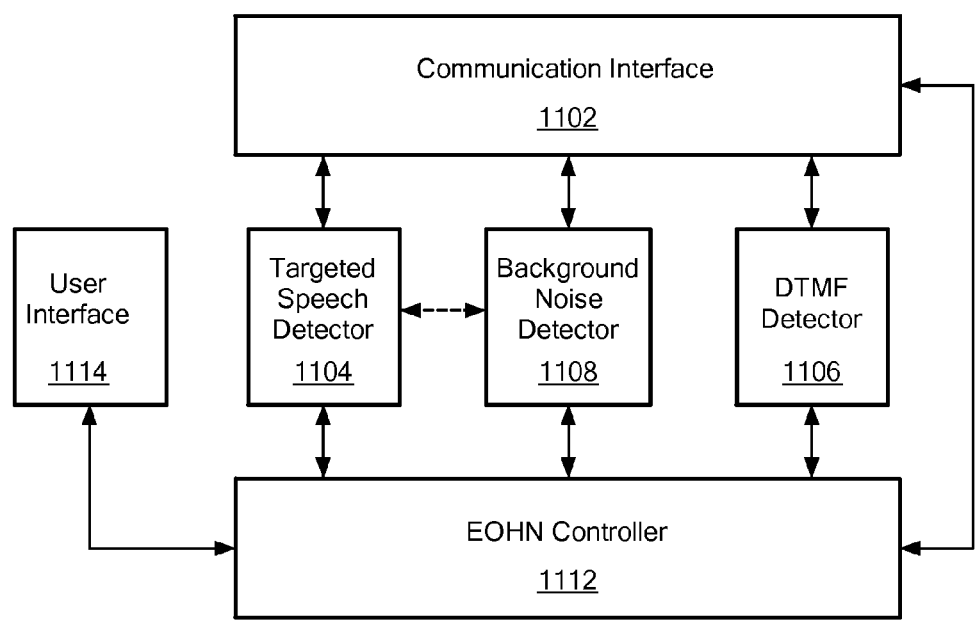
FIG. 11 is a schematic block diagram of an EOHN device, in accordance with an exemplary embodiment of the present invention.

FIG. 11 is a schematic block diagram of an EOHN device, in accordance with an exemplary embodiment of the present invention. Among other things, the EOHN device (which, using the examples above, may be the Party A device, the Party B device, an intermediate device, or another device) includes a communication interface 1102, a targeted speech detector 1104, an optional DTMF detector 1106, an optional background noise detector 1108, an EOHN controller 1112, and a user interface 1114. The communication interface 1102 may include, for example, a cellular telephone interface, a WiFi interface, an Internet interface, or other communication interface. As discussed above, the targeted speech detector 1104 is specifically configured to be sensitive to one or more predetermined words or phrases. The EOHN controller 1112 is configured to perform the overall EOHN functionality, including, for example, detecting EOHN activation (e.g., an input made through the user interface 1114 or a signal received over the communication interface 1102), sending and receiving EOHN messaging signals (e.g., a signal that EOHN has been activated, a signal specifying the targeted speech, etc.), controlling user interface functions (e.g., turning on/off a light, displaying a message, activating a notification device, configuring programmable keys, etc.), and to monitor for and detect EOH and other conditions. In this regard, the EOHN controller 1112 is configured to receive information from the targeted speech detector 1104 and optionally from the DTMF detector 1106 and background noise detector 1108 and to process the received information to determine whether an EOH condition exists and/or other conditions (e.g., invalid responses). An EOH condition may be defined based on any one or any combination of inputs from the targeted speech detector 1104, the DTMF detector 1106, and the background noise detector 1108 (e.g., the EOH condition may be defined as detection of a targeted word or phrase at any time or perhaps only after detecting a specific change in background noise signifying that Party B is likely back on the line). Additionally or alternatively, the targeted speech detector 1104 may be configured to utilize background noise sound level information, e.g., from the background noise detector 1108, in detecting the target word or phrase.

Figure 12:
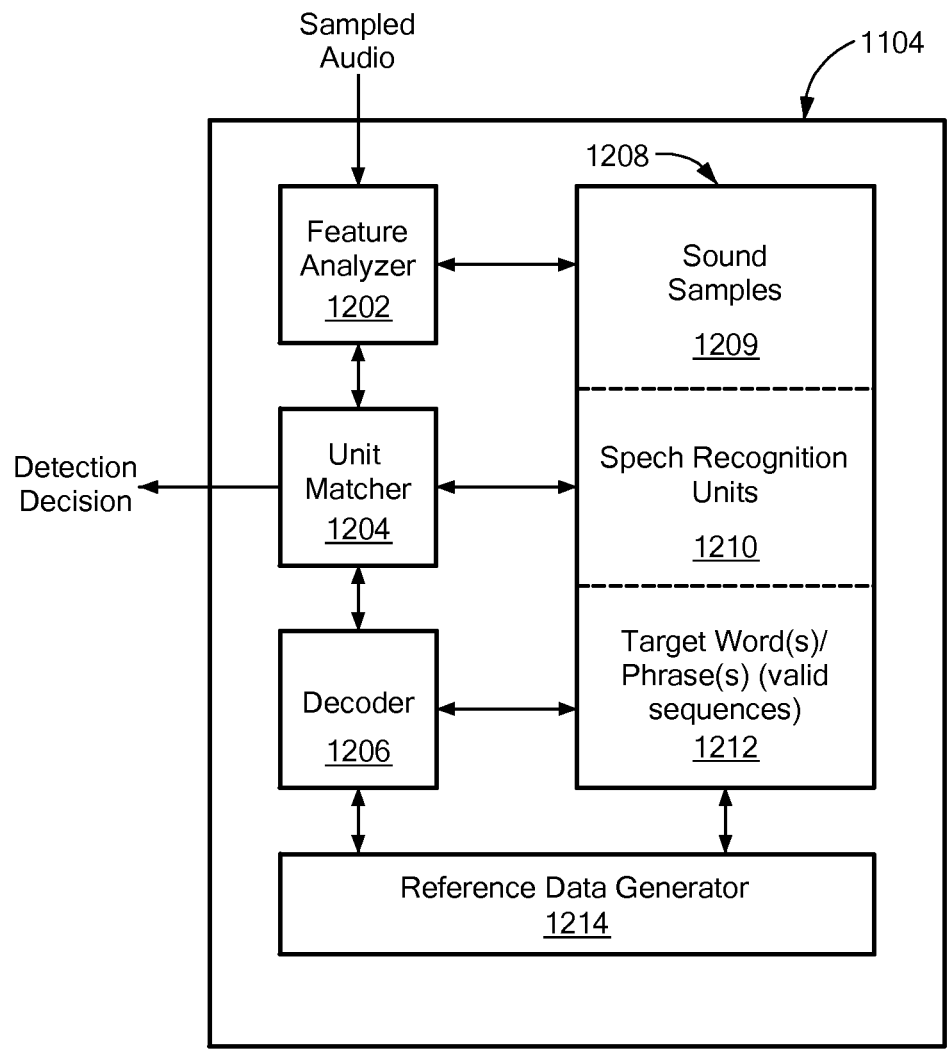
FIG. 12 is a schematic block diagram of the targeted speech detector, in accordance with an exemplary embodiment of the present invention.

FIG. 12 is a schematic block diagram of the targeted speech detector 1104, in accordance with an exemplary embodiment of the present invention. Among other things, the targeted speech detector 1104 includes a feature analyzer 1202, a unit matcher 1204, a decoder 1206, a reference database 1208, and optionally a reference data generator 1214. The reference database 1208 includes sound samples 1209, speech recognition units 1210, and target word(s)/phrase(s) 1212, which essentially are the valid sequences of units that define such target word(s)/phrase(s). The feature analyzer 1202 receives sampled audio information (i.e., a sequence of amplitude measurements), converts the sample audio information into discrete frequency-domain sound units (e.g., via fast Fourier transform), and assigns to each sound unit a numeric value that describes the sound (e.g., by matching the sound units to corresponding sound samples 1209), thereby producing a test pattern. The unit matcher 1204 matches combinations of speech recognition units 1210 to the test pattern, and the decoder 1206 constrains the unit matcher 1204 to search only sequences of speech recognition units that represent the target word(s) or phrase(s) 1212. The unit matcher 1204 essentially outputs a detection decision to the EOHN controller 1112, such as, for example, whether a targeted word or phrase was detected (yes or no) and/or the word or phrase that was detected. The reference data generator 1214 dynamically generates speech recognition units 1210 and target word/phrase sequences 1212 based on text and/or audio inputs of the targeted word(s)/phrase(s) to be detected, e.g., user-provided text and/or audio inputs for customized targeted EOH detection.

It should be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. An end-of-hold notification method comprising:
    upon activation of end-of-hold notification from a first communication device, (a) activating a targeted speech detector to monitor a communication connection with a second communication device, the targeted speech detector configured specifically to be sensitive to a predetermined end-of-hold word or phrase audibly received from the second communication device over the communication connection, and (b) providing a signal to the second communication device upon activation of the end-of-hold notification mechanism to indicate such activation, wherein the signal provided to the second communication device specifies the predetermined word or phrase;
    after detection of the predetermined word or phrase by the targeted speech detector, such detection indicating an end-of-hold condition, providing an indication to a user of the first communication device to indicate that communication with the second communication device can be resumed; and
    resuming communication between the first communication device and the second communication device.

2. A method according to claim 1, wherein the word or phrase is provided by the party who activates the end-of-hold notification mechanism.

3. A method according to claim 2, wherein the word or phrase is provided as a text input, and wherein the method further comprises:
    converting the text input to reference data for the targeted speech detector; and
    programming the targeted speech detector with the reference data.

4. A method according to claim 2, wherein the word or phrase is provided as an audio input, and wherein the method further comprises:
    converting the audio input to reference data for the targeted speech detector; and
    programming the targeted speech detector with the reference data.

5. A method according to claim 4, wherein the audio input represents a message to be played following activation of the end-of-hold notification mechanism, and wherein converting the audio input to reference data for the targeted speech detector comprises:
    processing the audio input to identify a portion of the message containing the word or phrase; and
    converting such portion of the message to reference data for the targeted speech detector.

6. A method according to claim 1, wherein the targeted speech detector is further configured to detect at least one DTMF signal that indicates the end-of-hold condition.

7. A method according to claim 1, further comprising:
    disconnecting the first communication device from the communication connection after activating the end-of-hold notification mechanism.

8. A method according to claim 1, wherein the signal provided to the second communication device includes an audio message.

9. A method according to claim 8, wherein the audio message includes a standard message.

10. A method according to claim 8, wherein the audio message includes a personalized message.

11. A method according to claim 1, wherein the signal provided to the second communication device includes a textual or graphical message for display on a phone or computer display.

12. A method according to claim 1, wherein the signal includes at least one of:
    an audio message played over the communication connection;
    a DTMF signal sent over the communication connection; and
    a signal sent outside of the communication connection.

13. A method according to claim 1, wherein the first communication device includes the targeted speech detector, and wherein activating the targeted speech detector comprises activating the targeted speech detector in the first communication device.

14. A method according to claim 1, wherein activating the targeted speech detector comprises activating the targeted speech detector in a device other than the first communication device, and, upon detection of the end-of-hold condition, sending a signal to the first communication device, and wherein providing the indication is prompted by such signal.

15. A method according to claim 1, wherein the targeted speech detector is further configured to detect a change in sound level, and wherein the end-of-hold determination is based at least in part on the detected change in sound level.

16. A method according to claim 1, further comprising: upon activation of the end-of-hold notification mechanism, disabling a microphone of the first communication device.

17. A method according to claim 1, further comprising: upon activation of the end-of-hold notification mechanism, terminating the first communication connection.

18. A method according to claim 1, further comprising: upon detecting speech other than the predetermined word or phrase, providing a signal to the second communication device to indicate that an unrecognized response was detected.

19. A method according to claim 1, further comprising: upon detecting the end-of-hold condition, providing a signal to the second communication device to indicate that communication with the first communication device is being resumed.

20. A method according to claim 1, further comprising: after resuming communication between the first communication device and the second communication device, automatically activating a speakerphone mode of the first communication device.

21. A method according to claim 1, further comprising: upon activation of the end-of-hold notification mechanism, starting a timer; and
upon expiration of the timer, deactivating the end-of-hold notification mechanism.

22. A method according to claim 1, further comprising: upon activation of the end-of-hold notification mechanism, disabling an input device on the first communication device to prevent accidental deactivation of the end-of-hold notification mechanism or accidental termination of the communication connection.

23. A method according to claim 1, further comprising: deactivating the end-of-hold notification mechanism prior to detection of the end-of-hold condition; and
providing a signal to the second communication device indicating such deactivation.

24. A method according to claim 1, further comprising: upon detection of an incoming call to the first communication device while end-of-hold notification is active, providing an indication to a user of the first communication device to indicate that there is an incoming call and allowing the user to ignore the incoming call or answer the incoming call.

25. A method according to claim 1, further comprising at least of one:
while end-of-hold notification is active, providing a periodic reminder to a user of the first communication device to remind the user that end-of-hold notification is active; or
while end-of-hold notification is active, allowing a user of the first communication device to disable end-of-hold notification.

26. Apparatus for end-of-hold notification, the apparatus comprising:
a communication interface;
a targeted speech detector configured specifically to be sensitive to a predetermined end-of-hold word or phrase audibly received over the communication interface; and
an end-of-hold notification controller configured to activate the targeted speech detector to monitor a communication connection with a second communication device upon activation of end-of-hold notification from a first communication device and to determine whether an end-of-hold condition exists based at least in part on an output of the targeted speech detector, the end-of-hold notification controller further configured to provide an indication to a user of the first communication device upon detection of the end-of-hold condition, wherein the end-of-hold notification controller is further configured to provide a signal to the second communication device after activation of end-of-hold notification to indicate such activation, wherein the signal provided to the second communication device specifies the predetermined word or phrase.

27. Apparatus according to claim 26, wherein the word or phrase is provided by a party who activates end-of-hold notification.

28. Apparatus according to claim 27, wherein the word or phrase is provided as a text input, and wherein targeted speech detector includes a reference data generator configured to convert the text input to reference data that is used by the targeted speech detector to detect the word or phrase.

29. Apparatus according to claim 27, wherein the word or phrase is provided as an audio input, and wherein targeted speech detector includes a reference data generator configured to convert the audio input to reference data that is used by the targeted speech detector to detect the word or phrase.

30. Apparatus according to claim 29, wherein the audio input represents a message to be played following activation of end-of-hold notification, and wherein the reference data generator is configured to process the audio input to identify a portion of the message containing the word or phrase and convert such portion of the message to reference data for the targeted speech detector.

31. Apparatus according to claim 26, further comprising a DTMF detector, wherein the end-of-hold notification controller is configured to detect at least one DTMF signal that indicates the end-of-hold condition.

32. Apparatus according to claim 26, wherein the end-of-hold notification controller is configured to disconnect the first communication device from the communication connection after activation of end-of-hold notification.

33. Apparatus according to claim 26, wherein the signal provided to the second communication device includes an audio message.

34. Apparatus according to claim 33, wherein the audio message includes a standard message.

35. Apparatus according to claim 33, wherein the audio message includes a personalized message.

36. Apparatus according to claim 26, wherein the signal provided to the second communication device includes a textual or graphical message for display on a phone or computer display.

37. Apparatus according to claim 26, wherein the signal includes at least one of:
an audio message played over the communication connection;
a DTMF signal sent over the communication connection; and
a signal sent outside of the communication connection.

38. Apparatus according to claim 26, wherein the first communication device includes the targeted speech detector.

39. Apparatus according to claim 26, wherein the targeted speech detector is in a device other than the first communication device, and, upon detection of the end-of-hold condition, the end-of-hold notification controller is configured to send a signal to the first communication device, wherein the indication is prompted by such signal.

40. Apparatus according to claim 26, wherein at least one of the targeted speech detector and the end-of-hold notification controller is configured to detect a change in sound level, wherein the end-of-hold determination is based at least in part on the detected change in sound level.

41. Apparatus according to claim 26, wherein the first communication device includes a microphone, and wherein at least one of the first communication device and the end-of-hold notification controller is configured to disable the microphone upon activation of end-of-hold notification.

42. Apparatus according to claim 26, wherein at least one of the first communication device and the end-of-hold notification controller is configured to terminate the communication connection upon activation of end-of-hold notification.

43. Apparatus according to claim 26, wherein the end-of-hold notification controller is configured to provide a signal to the second communication device upon detecting speech other than the predetermined word or phrase to indicate that an unrecognized response was detected.

44. Apparatus according to claim 26, wherein the end-of-hold notification controller is configured to provide a signal to the second communication device upon detecting the end-of-hold condition to indicate that communication with the first communication device is being resumed.

45. Apparatus according to claim 26, wherein at least one of the first communication device and the end-of-hold notification controller is configured to automatically activate a speakerphone mode of the first communication device after communication between the first communication device and the second communication device is resumed.

46. Apparatus according to claim 26, wherein the end-of-hold notification controller is configured to start a timer upon activation of end-of-hold notification and upon expiration of the timer, to deactivate end-of-hold notification.

47. Apparatus according to claim 26, wherein at least one of the first communication device and the end-of-hold notification controller is configured to disable an input device on the first communication device upon activation of end-of-hold notification to prevent accidental deactivation of end-of-hold notification or accidental termination of the communication connection.

48. Apparatus according to claim 26, wherein at least one of the first communication device and the end-of-hold notification controller is configured to deactivate end-of-hold notification prior to detection of the end-of-hold condition and to provide a signal to the second communication device indicating such deactivation.

49. Apparatus according to claim 26, wherein the end-of-hold notification controller is configured to provide an indication to a user of the first communication device to indicate that there is an incoming call and allow the user to ignore the incoming call or answer the incoming call, upon detection of an incoming call to the first communication device while end-of-hold notification is active.

50. Apparatus according to claim 26, wherein at least one of:
- the end-of-hold notification controller is configured to provide a periodic reminder to a user of the first communication device while end-of-hold notification is active to remind the user that end-of-hold notification is active; or
- the end-of-hold notification controller is configured to allow a user of the first communication device to disable end-of-hold notification while end-of-hold notification is active.

* * * * *